United States Patent
Stauber et al.

(10) Patent No.: US 10,141,168 B2
(45) Date of Patent: Nov. 27, 2018

(54) METHOD FOR CHARACTERISING A SAMPLE BY MASS SPECTROMETRY IMAGING

(71) Applicant: IMABIOTECH, Loos (FR)

(72) Inventors: Jonathan Stauber, Haubourdin (FR); David Bonnel, Laventie (FR); Fabien Pamelard, Armentieres (FR); Gael Picard De Muller, Lille (FR)

(73) Assignee: IMABIOTECH, Loos (FR)

( * ) Notice: Subject to any disclaimer, the term of this patent is extended or adjusted under 35 U.S.C. 154(b) by 0 days.

(21) Appl. No.: 15/438,946

(22) Filed: Feb. 22, 2017

(65) Prior Publication Data

US 2017/0221687 A1    Aug. 3, 2017

Related U.S. Application Data

(63) Continuation-in-part of application No. PCT/FR2015/052254, filed on Aug. 24, 2015.

(30) Foreign Application Priority Data

Aug. 26, 2014    (FR) ..................... 14 57993

(51) Int. Cl.
*H01J 49/00* (2006.01)
*G06T 7/00* (2017.01)

(52) U.S. Cl.
CPC ........ *H01J 49/0004* (2013.01); *G06T 7/0012* (2013.01); *H01J 49/0036* (2013.01); *G06T 2207/10061* (2013.01); *G06T 2207/30024* (2013.01); *G06T 2207/30061* (2013.01)

(58) Field of Classification Search
CPC ............... H01J 49/0004; H01J 49/0027; H01J 49/0031; H01J 49/0036; G06T 7/0012; G06T 2207/10061; G06T 2207/30024; G06T 2207/30061
See application file for complete search history.

(56) References Cited

U.S. PATENT DOCUMENTS

| | | | |
|---|---|---|---|
| 6,756,586 B2* | 6/2004 | Caprioli | G01N 33/6848 250/281 |
| 2012/0053447 A1 | 3/2012 | Duchesne | |
| 2015/0080233 A1* | 3/2015 | Bendall | G01N 33/5005 506/4 |

OTHER PUBLICATIONS

Reichenbach et al, "Interactive Spatio-Spectral Analysis of Three Dimensional Mass Spectral (3DxMS) Chemical Images", Surface and Interface Analysis, vol. 43, No. 1-2, 529-534, 2011.*
Wulfkuhle et al, "Early Detection: Proteomic Applications for the Early Detection of Cancer", Nature Reviews Cancer, vol. 3, No. 4, 2003, p. 267-275.*
Reichenbach et al, "Interactive Spatio-Spectral Analysis ofo Three Dimensional Mass Spectral (3DxMS) Chemical Images", Surface and Interface Analysis, vol. 43, No. 1-2, 529-534, 2011.*

(Continued)

*Primary Examiner* — David E Smith
(74) *Attorney, Agent, or Firm* — Young & Thompson

(57) ABSTRACT

Disclosed is a method for characterizing a sample by mass spectrometry imaging (MSI) according to which a spatial arrangement of at least one ion in the sample is characterized from imaging data associated with the ion, in terms of morphology and/or texture.

Figure 1:
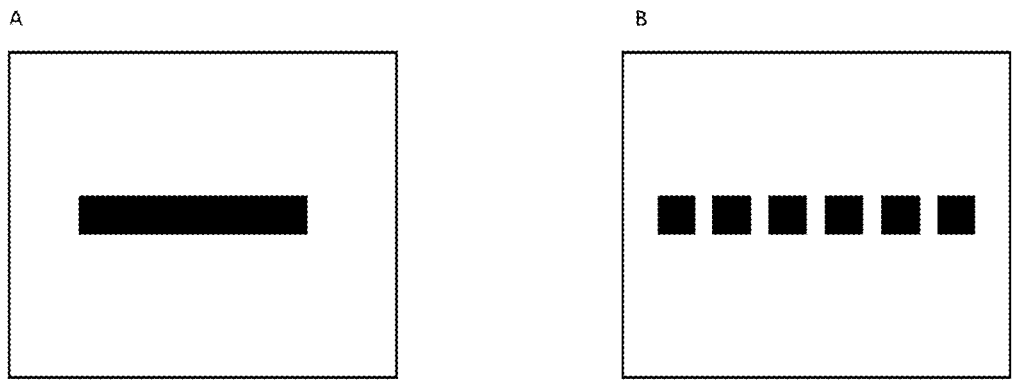

25 Claims, 8 Drawing Sheets
(3 of 8 Drawing Sheet(s) Filed in Color)

(56) References Cited

OTHER PUBLICATIONS

Lu-Tao Weng et al.: "Morphology and Miscibility of Blends of Ethylene-Tetrafluoroethylene Copolymer/Poly(methyl methacrylate) Studied by ToF SIMS Imaging", Macromolecules, vol. 31, No. 3, Feb. 1, 1998 (Feb. 1, 1998), pp. 928-932, XP055198254, ISSN: 0024-9297, p. 931.
Stephen E. Reichenbach et al.:"Interactive spatia-spectral analysis of three-dimensional mass-spectral (3DxMS) chemical images", Surface and Interface Analysis, vol. 43, No. 1-2, 529-534, XP055198365, ISSN: 0142-2421, DOI:Jan. 9, 2011 (Jan. 9, 2011), p. 532.
Ahmed S. Attia et al.: "Monitoring the Inflammatory Response to Infection through the Integration of MALDI IMS and MRI", Cell Host & Microbe, vol. 11, No. 6, Jun. 1, 2012 (Jun. 1, 2012), pp. 664-673, XP055198570, ISSN: 1931-3128,.
Karl E Mayerhofer et al.: "Three dimensional analysis of self-structuring organic thin films using time-of-flight secondary ion mass spectrometry", Thin Solid Films, Elsevier-Sequoia S.A. Lausanne, CH, vol. 519, No. 18, Apr. 5, 2011 (Apr. 5, 2011), pp. 6183-6189, XP028227208, ISSN: 0040-6090, [retrieved on Apr. 15, 2011] p. 6183-p. 6185; figures 2, 5; tables I, 2.
Per Malmberg et al.: "Subcellular localisation of cholesterol and phosphocholine with pattern-recognition-imaging-TOF-SIMS", Spectroscopy, vol. 18, No. 4, Jan. 1, 2004 (Jan. 1, 2004), pp. 503-511, XP055198349, ISSN: 0712-4813 p. 508-p. 510; figures 4-6.
Julia D. Wulfkuhle et al.: "Early detection: Proteomic applications for the early detection of cancer", Nature Reviews Cancer, vol. 3, No. 4, Apr. 1, 2003 (Apr. 1, 2003), pp. 267-275, XP055091735, ISSN: 1474-175X.
Rita Casadonte et al.: "Imaging mass spectrometry to discriminate breast from pancreatic cancer metastasis in formalin-fixed paraffin-embedded tissues", Proteomics, vol. 14, No. 7-8, Apr. 5, 2014 (Apr. 5, 2014), pp. 956-964, XP055198420.
Theodore Alexandrov et al.: "MALDI—imaging segmentation is a powerful tool for spatial functional proteomic analysis of human larynx carcinoma", Journal of Cancer Research and Clinical Oncology, Springer, Berlin, DE, vol. 139, No. 1, Sep. 6, 2012 (Sep. 6, 2012), pp. 85-95, XP035157149.
International Search Report, dated Nov. 2, 2015, from corresponding PCT application.

\* cited by examiner

| Group A sample | | Group B sample | Example of morphological criteria for differentiating the group A and the group B for a given ion |
|---|---|---|---|
| 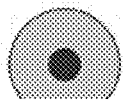 | vs. |  | *Number of objects*<br>*Total surface of objects* |
| 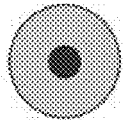 | vs. | 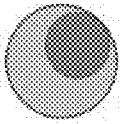 | *Average surface of objects*<br>*Maximum radius of opening of a granulometry* |
| 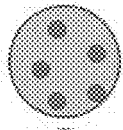 | vs. | 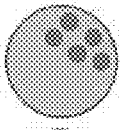 | *Dispersion of objects' geometrical center* |
| 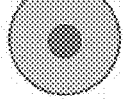 | vs. |  | *Correlations between skeleton and patterns*<br>*Number of objects after opening with shapes* |
| 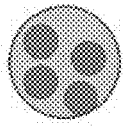 | vs. | 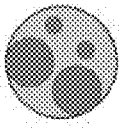 | *Surface IQR*<br>*Changes in average surface when resampling* |

FIGURE 7

METHOD FOR CHARACTERISING A SAMPLE BY MASS SPECTROMETRY IMAGING

TECHNICAL FIELD

The invention relates to a method for characterizing a sample by using mass spectrometry imaging. More particularly, the invention proposes the use of imaging data obtained by mass spectrometry for extracting and measuring morphometric data and/or texture data associated with the distribution of one or several ions in a sample. The invention also proposes the use of such morphometric data and/or texture data for identifying and/or selecting one or several molecules of interest in a sample. The invention also proposes the use of such morphometric data and/or texture data for modeling tissue, wherein said tissue model may be further used to identify pathogen tissues.

Generally, the invention finds applications in any field where the characterization of a sample or of a compound in a sample is useful/necessary. For example, the invention finds applications in the pharmaceutical field for identifying molecular markers in different biological tissues, or in the field of medical diagnostics, in order to identify a type of tissue and/or of cell in a sample. Also, the invention may be used in the field of quality control, in order to check that parts actually have the desired characteristics.

STATE OF THE ART

Mass spectrometry is a technique widely known and used in chemical and biochemical analysis, for detecting and identifying molecules of interest in a sample. In recent years, molecular imaging by mass spectrometry has been developed, giving the possibility of viewing the distribution of molecules of interest directly in a sample. Mass spectrometry imaging (MSI) gathers all the imaging techniques using an ionization source giving the possibility of localizing molecular ions from a sample. Mention may be made of multiples ionization sources, such as the Laser, ions, gas, a liquid, a solvent, a plasma (sources alone or combined), micro-waves, electrons, which may be used in an imaging mode, such as DESI ("Desorption Electrospray Ionization"), LAESI ("Laser Ablation Electrospray Ionization"), MALDI ("Matrix-Assisted Laser Desorption Ionization"), SIMS ("Secondary Ion Mass Spectrometry"), MALDESI ("Matrix-Assisted Laser Desorption Electrospray Ionization") and LESA ("Liquid Extraction Surface Analysis"), ICP-MSI (Inductively Coupled Plasma Mass Spectrometry Imaging).

Imaging by mass spectrometry is presently mainly used for analysis of biological tissues. Indeed, it is possible by means of MSI to directly study the molecular composition of a tissue or of a section of the latter, without marking by fluorescence and without any radioactivity. Furthermore, because of its specificity, MSI gives the possibility of discriminating and identifying detected ions directly on the sample. Thus, it is now common to use MSI for studying or searching for endogenous molecular markers in biological samples of interest. More specifically, it is possible to directly analyze the distribution of a known molecule by targeting an ion or its mass over charge ratio (m/z). It is also possible to use statistical tools, and notably ACP (Principle Component Analysis), PLSA, T-Test, ANOVA, or other tool, in order to compare at least two regions of interest and thereby identify one or several molecules specific to one or the other of these regions (J. Stauber, et al., J Proteome Res, 2008. 7(3): p. 969-78; D. Bonnel et al., Anal Bioanal Chem, 2011). The use of segmentation methods during the analysis of the spectra of an image of a sample is also known, in order to classify the spectra according to the intensity of the ions of said sample. Thus, the characterization of a biological tissue is known according to the molecular intensity profile of the detected histological areas (T. Alexandrov et al., J Cancer Res Clin Oncol, 2012. 139(1): p. 85-95; T. Alexandrov et al., J Proteomics, 2011. 75(1): p. 237-45). It is then possible to classify tissues according to their complete molecular profiles and no longer only according to the spectral profile of a few markers.

However, all the MSI data analysis methods are presently based on the study of the intensity values associated with the m/z ratios. More specifically, during the acquisition of an image of a sample by MSI, said sample is analyzed with a beam from the ionization source in order to record in each point of the sample an average spectrum corresponding to the detected ions. The whole of the recorded data appears as a matrix with, for each recording coordinate, a spectrum which contains on one column the different m/z ratios and in a second column the corresponding intensities. Subsequently, for a particular ion (i.e. a given m/z ratio) corresponding to a particular compound, the measurement of the intensity of this ion (or the integral of the area of the peak) gives the possibility through image reconstruction softwares of obtaining the distribution of this ion (and therefore of the corresponding compound) by taking into account the intensity of the peak with the recording coordinates and by assigning to each point a pixel with a defined color and/or color intensity. Alternatively, it is also known how to defocus the ionization source so as to analyze all or part of the sample in a single shot. The localization is then obtained by means of a position detector (Luxembourg et al., Anal. Chem 2004).

However, it is not possible to discriminate two biological samples having the same profiles or spectral signatures, even if they exhibited different tissue and/or cell organizations. It is then necessary to combine the analysis by MSI with another method for analyzing the sample such as staining (immunohistochemistry, historadiography etc.), in order to for example identify differences in the tissue organization of both samples.

SUMMARY OF THE INVENTION

The invention proposes the use of imaging data of a sample (i.e., positions, m/z ratio, intensities), conventionally obtained by imaging by mass spectrometry, no longer only with the taking into account of the intensity values associated with the ions of said sample, but by taking into account the spatial arrangement of said ions in the sample, and measurements which characterize said spatial arrangement.

According to the invention, a sample is characterized according to the morphology of the distribution and to the associated measurements (morphometric data), and/or on the texture of one or several ions in the sample. The shapes and the arrangements of the shapes associated with the presence of said ions in a sample give the possibility of obtaining additional information (surface, shape, volume, pattern, repetition, amount, dispersion, and the values which derive from these informations, such as their ratio, etc.) relatively to the informations resulting from the spectral intensities. It is then possible to characterize a sample according to the shapes of at least one ion in said sample and/or on the dimensions of these shapes and/or on their arrangement in the sample. According to the invention, it is thus possible to differentiate two samples having similar or identical molecular profiles. Also, it is possible to identify a sample on the basis of its morphometric and/or texture data, to identify molecules of interest in a sample by targeting for example specific shapes and/or textures, etc. More generally, the invention proposes the characterization of the morphometry and/or the texture of the distribution of one or several ions in a sample and the use of these morphometric and texture data in addition to or instead of the spectral imaging data. According to the invention, this characterization may be combined with present imaging data processing methods for example taking into account intensities, and more generally with any characterization method for a sample, including by optical, physical processing, by coloration etc.

The object of the invention is therefore a method for characterizing a sample by mass spectrometry imaging (MSI) according to which a spatial arrangement of at least one ion in said sample is characterized from imaging data associated with said ion, in terms of morphometry and/or texture.

In other words, the spatial arrangement of at least one ion in said sample is measured and/or quantified from MSI data, in order to identify shapes, arrangements of shapes, particular measurements and to accordingly characterize the distribution of said ion in the sample by its morphometric and/or texture features.

The object of the invention is also a process for identifying a new molecule of interest in a sample, according to which
i) a plurality of morphometric and/or texture associated with a plurality of ions in said sample is compared with morphometric and/or texture data associated with a plurality of ions in a reference sample;
ii) at least one characteristic ion of the sample is identified;
iii) the molecule corresponding to said ion identified in step ii) is identified.

The invention also proposes a process for identifying a sample by mass spectrometry imaging wherein:
i) A database or a model is established with morphometric and/or texture data associated with a plurality of reference ions, obtained from several reference samples, said morphometric and/or texture data being representative of the spatial arrangement of said reference ions in said reference samples;
ii) Morphometric and/or texture data associated with at least one ion in the sample to be identified are recorded;
iii) Morphometric and/or texture data associated with the ions of the sample to be identified are compared with the morphometric and/or texture data associated with reference ions contained in the database or the model.

Another object of the invention consists in a data support legible by a computer comprising instructions which may be executed by the computer and adapted for allowing a computer system to execute at least one step of the characterization method for a sample, and/or at least one step of the process for identifying a sample and/or at least one step of the process for identifying a molecule of interest in a sample according to the invention.

SHORT DESCRIPTION OF THE FIGURES

The file of this patent contains at least one drawing executed in color. Copies of this patent with color drawings will be provided by the Patent and Trademark Office upon request and payment of the necessary fee.

Figure 2:
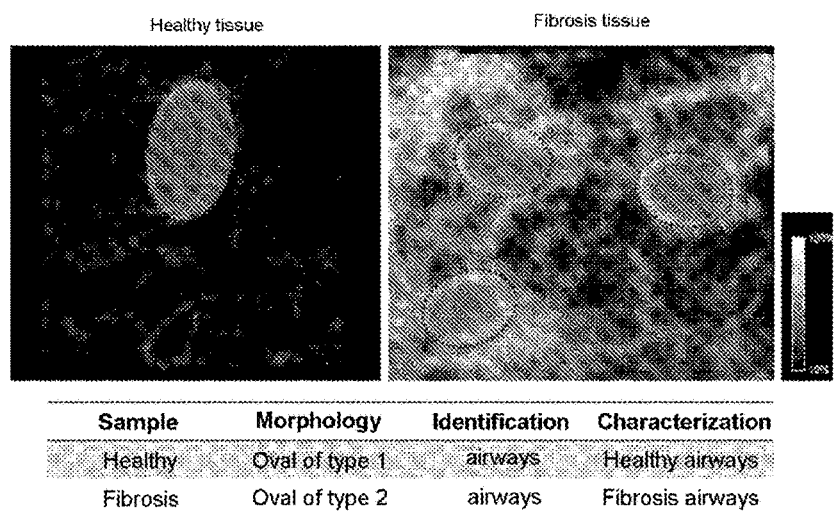
Figure 3:
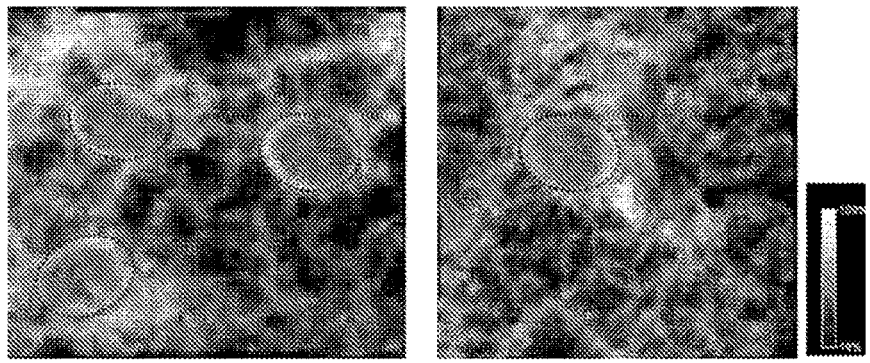
Figure 4:
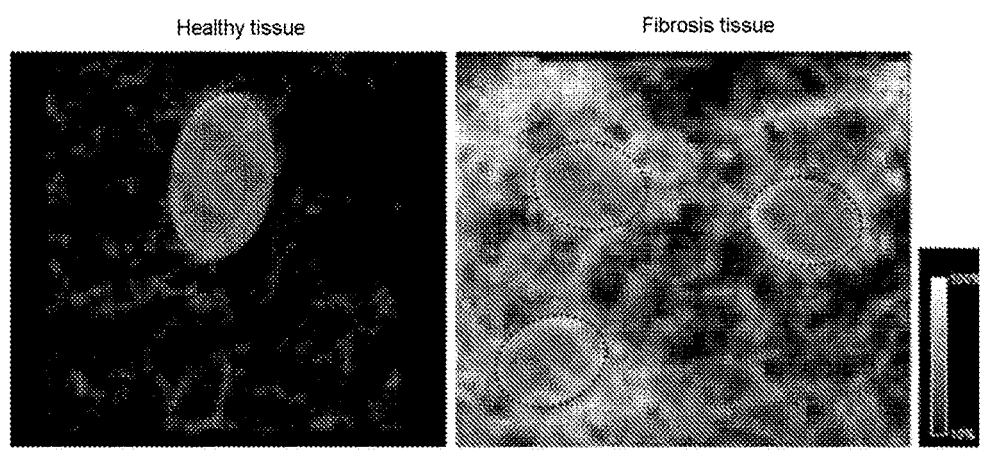
Figure 5:
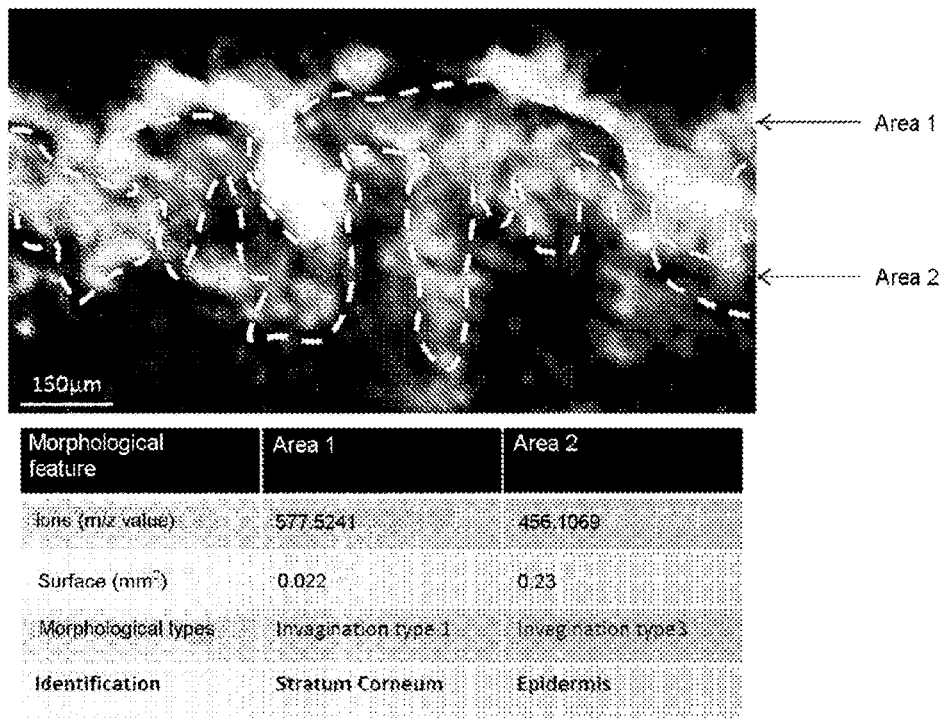

FIG. 1: Illustrative example of data sets acquired by mass spectrometry imaging for two samples (1A and 1B), where white has the value 0 and black has a maximum value;

FIG. 2: Example of a morphological characterization of mass spectrometry imaging data of lung tissue samples according to the invention, resulting in the identification of a pathological lung tissue (fibrosis airways) comparatively with a healthy tissue (healthy airways);

FIG. 3: Example of counting the airways by morphometry by applying the process according to the invention to sets of mass spectrometry imaging data of two airway samples of two fibrosis tissues;

FIG. 4: Analysis and determination of the surface of the airways of rat lungs by extrapolating morphological data obtained by the process according to the invention from imaging data of said samples;

FIG. 5: Illustration of the distribution of two ions in a skin sample by mass spectrometry imaging and characterization of their spatial arrangement in the sample for identifying tissues (e.g. epidermis and stratum corneum)

Figure 6:
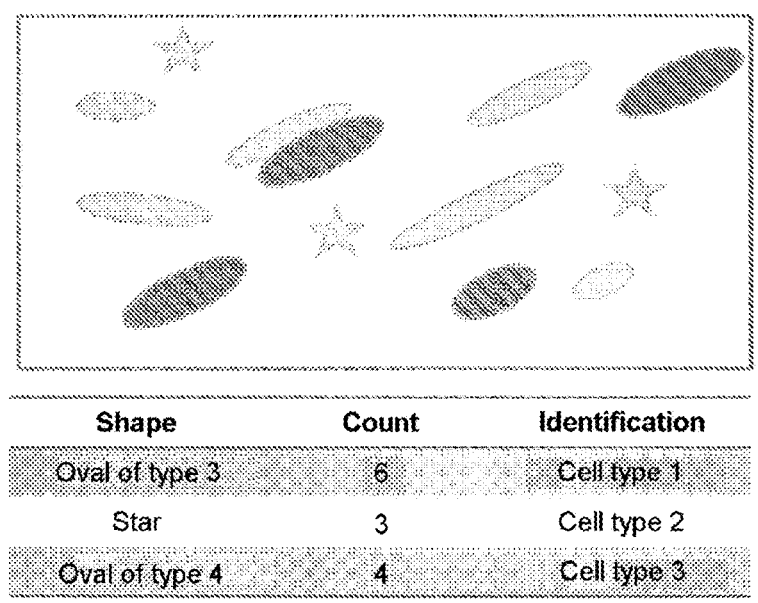
Figure 8:
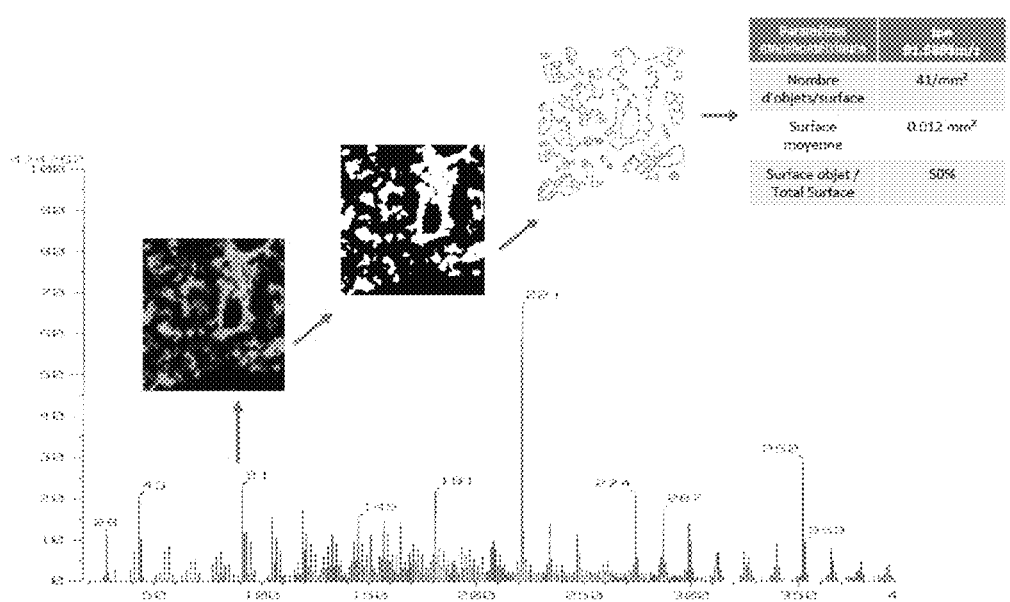
Figure 9:
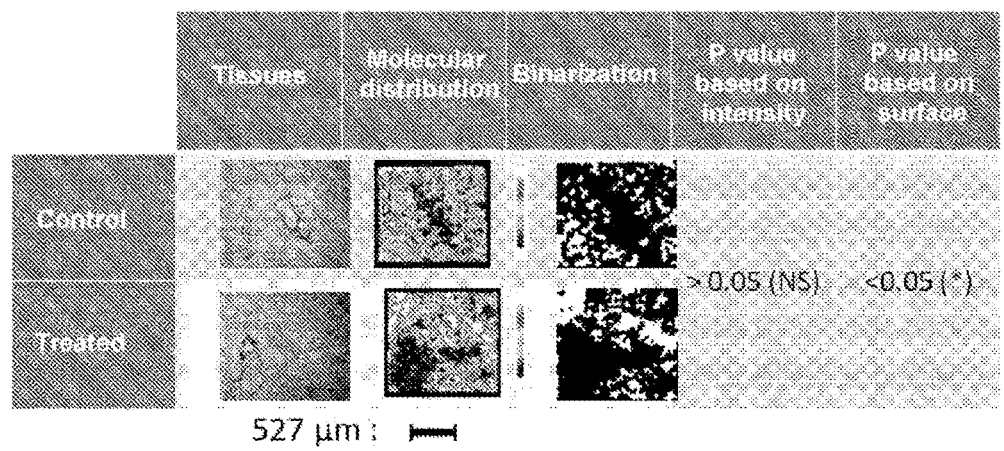
Figure 10:
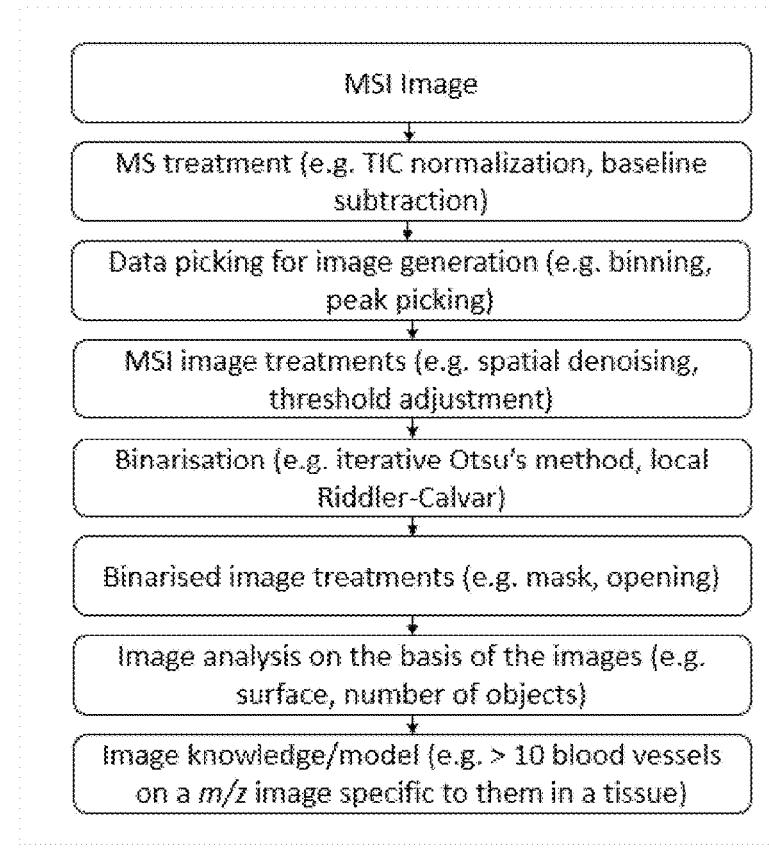
Figure 11:
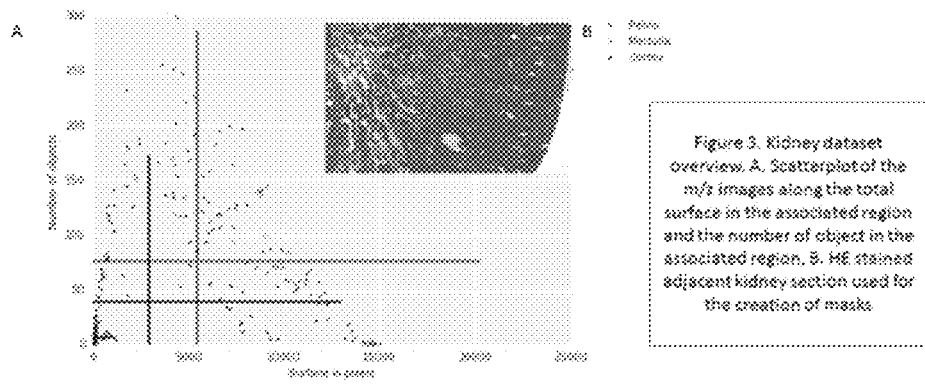
Figure 12:
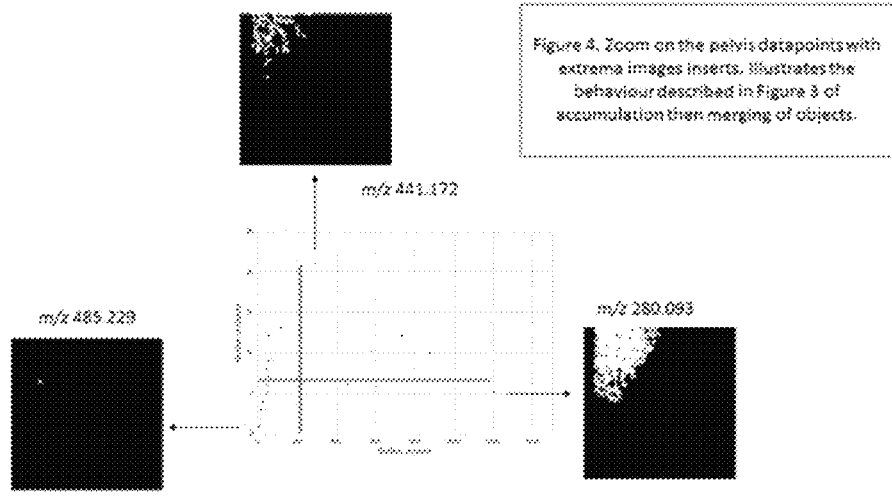
Figure 13:
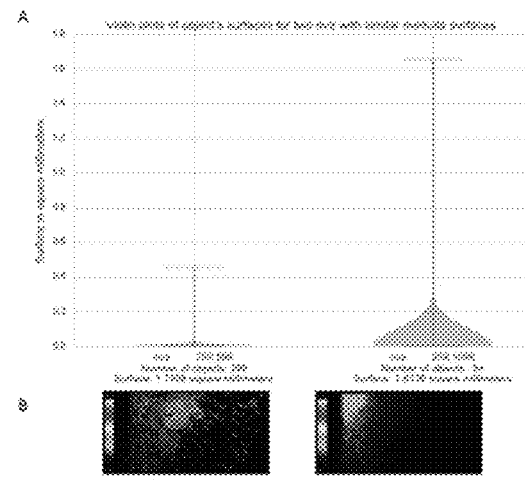

FIG. 6: Schematic illustration of the patterns and textures obtained from data sets from mass spectrometry imaging of a section of a biological tissue on a Petri dish, by the process according to the invention applied to the counting and typing cells in said biological tissue section;

FIG. 7: Schematic illustration of different morphometric criteria for a target ion which may be used for discriminating two regions of interest in samples A and B having identical intensity averages for said target ion, not allowing by themselves their differentiation. For a same intensity average for a given ion, the distribution may thus vary in terms of the number of objects, the surface of the object, the dispersion in the region of interest, the shape, variability of the surfaces from one object to the other, etc.;

FIG. 8: Schematic illustration of certain steps of the characterization and/or identification process according to the invention, resulting in the extraction of morphometric criteria for the ion having a m/z of 91.5895 in a sample: the molecular image is subject to segmentation in order to obtain a binary image which is treated so as to characterize the distribution of said ion according to a number of objects and the surface of said objects;

FIG. 9: Comparison for a reference tissue (control tissue) and a tissue of interest (treated tissue) from the distribution of the m/z of 718.505 at the molecular image showing the intensity of the distribution and of the binary image putting forward the distribution surface difference of said m/z;

FIG. 10: Example of workflow illustrating possible actions for an automatic knowledge extraction from a MSI image;

FIG. 11: Kidney dataset overview. A. Scatterplot of the m/z images along the total surface in the associated region and the number of object in the associated region, B. HE stained adjacent kidney section used for the creation of masks;

FIG. 12: Zoom on the pelvis datapoints with extrema images inserts. Illustrates the behaviour described in FIG. 11 of accumulation then merging of objects;

FIG. 13: Distribution differences between m/z of similar surface for the medulla region (surface fold change close to 1 number of objects fold change >5). A. Violin plots associated to m/z 760.596 and m/z 258.1096 (gaussian kernel, extrema indicated by bars), B. m/z images associated to m/z 760.596 and m/z 258.1096

Figure 14:
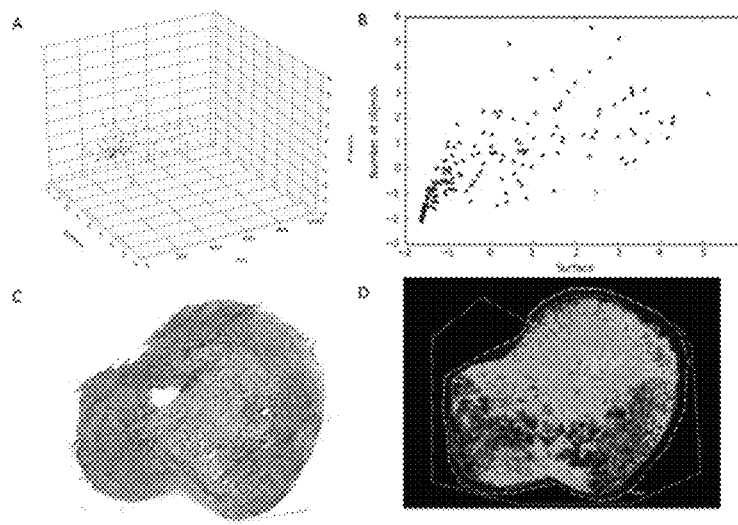

FIG. 14: Illustration of m/z 186.0496. A. 3D scatterplot of the sum of the standardized surface and number of objects depending on the m/z, B. Projection of the previous plot to the number of objects and surface axes, C. HE staining of an adjacent slice, D. Molecular image of a m/z showing a high surface with few objects

DETAILED DESCRIPTION OF THE INVENTION

The object of the invention is therefore a method for characterizing a sample by mass spectrometry imaging (MSI) according to which a spatial arrangement of at least one ion in said sample is characterized from imaging data associated with said ion, in terms of morphometry and/or texture. According to the invention, the distribution of the ion in the sample is no longer only characterized according to the intensity but also according to shapes/objects drawn by this distribution and to the associated measurements (surface, volume, etc.) and/or on the arrangement of these shapes/objects between them. It is then easily possible to discriminate two samples which, although having an identical average intensity for a given ion, have different morphometric and/or texture features associated with said ion. The morphological analysis of present invention, instead of looking at the molecular intensity or concentration within the tissue, may be particularly useful to describe and then identify markers that correlate with different tissue states. Generally speaking, the process of the invention renders the classical study of the average intensity for sample characterization and biomarker discovery usefulness.

The method according to the invention may be applied to any type of sample which may be analyzed by mass spectrometry in vacuum (MALDI) or in an ambient atmosphere (LAESI, DESI), whether it is organic or inorganic, liquid or solid. For example, the method according to the invention is particularly adapted to the characterization of biological tissues, of animal or plant origin.

By "tissue", is generally meant a set of cells of the same origin and grouped in a functional assembly in order to complete for a same function. In certain cases, a tissue may be understood as an organ, an organ fragment or a specific region of an organ, possibly grouping several assemblies of cells. For example, the tissue may be a localized tumor within an organ.

In an exemplary embodiment, the sample may consist in a histological section of tissue(s), for which the regions of interest have possibly been characterized beforehand by staining and/or by their molecular signatures. More generally, the method according to the invention may be used for further characterizing all or part of regions of interest of a sample, identified beforehand by any method of the state of the art.

The method according to the invention may also be used for characterizing biological liquids, such as blood, plasma, serum, saliva, cerebro-spinal liquid, urine, etc.

In the case of a liquid sample, it is possible to dry it on a surface in order to produce the MS image of the dried sample, and then to characterize this sample with the described method. Otherwise it is possible, notably with an MSI system said to be at atmospheric pressure, to analyze the surface of a liquid or of a solvent.

The method according to the invention may also be used for characterizing environmental samples, such as soil, water, plant samples, etc.

In an exemplary embodiment, the method according to the invention is used for characterizing objects, such as electronic components, biomaterials, capsules, high precision parts, etc.

By "characterizing a sample", is meant the association of distinctive/specific properties to said sample, said properties notably allowing its discrimination/identification from among other samples.

According to the invention imaging data are used, and more particularly spectra, in order to determine for a given ion the spatial arrangement which it assumes in said sample. Advantageously, data associated with an m/z ratio characteristic of a given ion are more particularly used. In the context of the invention, the expression "m/z ratio", or "mass over charge ratio", designates a physical quantity characteristic of an ion, wherein m represents the mass and z the valency of said ion. In mass spectrometry imaging, a given ion may correspond to several m/z ratios.

The "spatial arrangement" or "distribution" of an ion or of an m/z ratio is meant of the shape(s) which are drawn by the presence of said ion or m/z ratio in the sample.

According to the invention, the spatial arrangement of the studied ion(s) is determined in order to associate with it one or several shapes, dimensions, etc. The imaging data associated with the presence of at least one ion in the sample are used for defining morphometric and/or texture data representative of the distribution of said ion in the sample, independently of the variation of the intensities associated with said ion in said sample.

Advantageously, the step for characterizing the spatial arrangement of at least one ion in the sample uses a shape recognition and/or texture analysis process for segmenting the imaging data of said ion in distinct regions of interest and/or drawing the contours of patterns. For example, a mathematical morphology technique is used, such as the water dividing line technique, Hough's transform, notably in its generalized shape, spatial dependency matrices of gray tones, etc.

By "morphometric data" or "morphometric features", are meant data/features relative to the geometrical shape(s), or pattern(s), formed by the presence of the relevant ion in the sample (or of the m/z ratio associated with said ion), and/or to their mathematical dimensions, such as a surface, a volume, a diameter, a radius, a length, a width, a thickness, etc. In certain cases, the patterns may consist in writing elements, such as figures, letters, words, etc.

By "texture data" or "texture features", are meant data/features relative to an arrangement of the patterns with each other in the sample, such as the number of recurrent patterns, a distance, a dispersion between said patterns, etc.

By "reference sample", is meant a sample of the same nature and/or origin as the sample of interest. For example, during the study of a biological tissue of a subject of interest, the reference sample consists in a biological tissue of the same nature stemming from a control subject.

According to the invention, it is possible to characterize the spatial arrangement of one or several ions or m/z ratios of said sample, taken together or separately. Thus, a given pattern may be associated with the presence and distribution of several m/z ratios taken into consideration simultaneously. Alternatively, it is possible to characterize different patterns for different m/z ratios in a same sample, either simultaneously or sequentially. According to the invention, these different m/z ratios may be representative of a same ion or of different ions.

In an embodiment, the method according to the invention comprises a preliminary step for acquiring imaging data from which are determined the morphometric and/or texture features of at least one m/z ratio.

The method according to the invention may be implemented with any known mass spectrometry imaging technique, and notably MALDI, LDI, DESI, LESA, LAESI (Laser Ablation Electrospray Ionization), DART (Direct Analysis in Real Time), SIMS, JEDI (Jet Desorption Electrospray Ionization), LAMMA (Laser Microprobe Mass Analysis), SMALDI (Scanning Microprobe Matrix Assisted Laser Desorption Ionization) imaging in combination with different types of analyzers, such as TOF (Time of Flight), Orbitrap, FTICR (Fourier Transform Ion Cyclotron Resonance), Quadripole ("either simple or triple"), ICP MS (analyzers), etc.

In a particular embodiment of the invention, it is possible to view the morphometric and/or texture features associated with at least one ion directly on an ionic image of the sample, for example by using MALDI imaging. More specifically, the morphometric and/or texture features associated with the analyzed ions may be generated as images reproducing the sample, so that it is possible to view their spatial arrangements therein. Of course, it is possible to superpose different images of the sample, in order to simultaneously view data of several ions, and even histological data or other data obtained by other analysis methods such as optical microscopy, histological staining, etc.

In an embodiment, the method for characterizing a sample according to the invention comprises the steps of:
a) Acquiring data with MSI, for at least one ion in the sample; and then
b) Characterizing a spatial arrangement of said at least one ion in the sample from data relative to the positions of said at least one ion, according to morphometric and/or texture features.

From the spatial arrangement of an ion in a sample of interest, said ion is characterized by its morphometric and texture features, specific to said sample. A same ion, in another sample may have different morphometric and texture features, even if the molecular profiles of both samples were identical.

Thus, the process according to the invention gives the possibility of acquiring another level of information for an ion in a sample, which may be taken into account alone or in combination with any other datum/feature of the sample and/or of the relevant ion. For example, it is possible to simultaneously or sequentially analyze not only the morphometric and texture features of an ion of interest, but also all or part of its spectral characteristics (intensity of the peaks of the mass spectra, signal-to-noise ratio (S/N), area of the peaks, etc.).

Advantageously, the process according to the invention gives the possibility of simultaneously viewing the whole of these data/features directly on a same ionic image of the sample.

In another embodiment, the method for characterizing a sample according to the invention comprises the steps of:
c) Segmenting imaging data of the sample into regions of interest representative of the molecular intensity profiles of the sample; and
d) Characterizing a spatial arrangement of the ions of the molecular profile of a region of interest according to morphometric and/or texture features.

The step c) consists in a segmentation of the sample according to molecular profiles within said sample. Each region of interest corresponds to a molecular profile obtained from mass spectra of the sample. Different spectral characteristics may be conventionally used for obtaining the molecular profiles of said sample, and notably the intensity of the peaks of the mass spectra, the signal-to-noise ratio (S/N), the area of the peaks, etc.

Once the region(s) of interest in the sample have been identified, the imaging data associated with the selected region of interest are processed in order to characterize the spatial arrangement of the whole of the ions of said selected region of interest. These are the data of the whole of the ions in the region of interest which are taken into account and analyzed for identifying the characteristic patterns and textures of said region of interest. There again, according to the invention, it is possible to reconstruct a digital image of the sample from these data so as to view the results directly on an image of the sample.

According to the invention, the steps c) and d) may be applied independently of the steps a) and b), i.e. without applying steps a) and b). In another particular embodiment, it is possible to successively apply steps a) and b), and then c) and d), or vice versa, so as to obtain different levels of information in terms of morphometry and texture of the relevant ion(s) on the relevant sample. Also, it is possible to apply step d) to several or all the regions of interest identified in step c).

In another embodiment of the invention, the characterization method comprises the step of:
e) Making a database (DB) comprising morphometric and/or texture data from a plurality of ions in said sample.

Alternatively, the characterization method comprises the step of:
f) Generating a model comprising morphometric and/or texture data of a plurality of ions in said sample.

In the context of the invention, "a plurality" means two or more.

A "model" is meant a data set, in the present case with characteristics from the sample, notably intensity data, morphometric and/or texture data, etc., which have been modeled notably for defining the dependences and/or the relationships between said data, and which is representative of the relevant sample. A "database" as for it refers to a base in which is stored a set of crude data.

Thus, it is possible to obtain an assembly of data sets, i.e. of patterns, dimensions, arrangements, etc., specific to a sample or type of sample, or a model. According to the invention, this database (DB) or this model may be implemented (step g) with spectral MSI data of at least one ion in said sample, and/or physicochemical, physiological and/or biological data specific to said sample. For example, the database (DB), or the model, is implemented with data obtained by a histological, chemical or other study of the sample, or of an identical sample, in order to define different areas of interest.

Such a database (DB) or model, may be particularly useful for rapidly identifying and in an automated way a tissue, a region of a tissue, a cell type, a physiological condition of a tissue for example either healthy or pathological, etc. Also, the database, or the model may be used for cell identification and counting, or numbering in a biological sample.

The object of the invention is also a process for identifying a sample by mass spectrometry imaging wherein:
i) A database is established or a model is generated with morphometric and/or texture data associated with at least one reference ion, obtained from several reference samples, said morphometric and/or texture data being representative of the spatial arrangement of said at least one reference ion in said reference samples;
ii) Morphometric and/or texture data are recorded (surface, volume, shape, pattern, repetition, etc.) associated with at least one ion in the sample to be identified;
iii) Morphometric and/or texture data of step ii) are compared with the morphometric and/or texture data contained in the database, or the model, of step i).

According to the invention, in step ii) an ion is analyzed corresponding to an ion from the database, or from the model. Advantageously, the database, or the model, comprises morphometric and/or texture data associated or not with a plurality of reference ions.

The whole of the characteristics and definitions described above in connection with the method for characterizing a sample is applied mutatis mutandis to said identification process.

Advantageously, for each reference sample, a set of morphological and texture data is established for several ions so as to characterize as reliably as possible each of the reference samples.

According to the invention, in step iii) it is proceeded with analysis of the similarities and/or differences between the different sets of reference data and the sets of data of the sample to be identified, so as to select the reference sample(s) having similar or identical morphometric features, and thereby identifying the sample.

The process according to the invention may for example give the possibility of identifying the nature and/or the origin of a biological tissue, a cell type, the development stage of a disease, etc.

The object of the invention is also a process for identifying a molecule of interest in a sample, according to which
i) morphometric and/or texture data associated with a plurality of ions in said sample are compared with morphometric and/or texture data associated with a plurality of ions in a reference sample;
ii) at least one characteristic ion of the sample is identified, advantageously absent in the reference sample;
iii) the molecule corresponding to said ion identified in the preceding step is identified.

Such a process gives the possibility of discovering and identifying a new molecule in a sample of interest.

In an embodiment, the process for identifying a new molecule of interest in a sample of interest comprises beforehand a step for acquiring MSI data specific to said sample and for characterizing the distribution of one or several ions by morphometric and/or texture features.

The whole of the characteristics and definitions described above in connection with the method for characterizing a sample are applied mutatis mutandis to the present process for identifying a molecule.

According to this embodiment of the invention, the nature of the sample is known and one or several markers specific to said sample are desirably identified, i.e. those which are not present in the reference sample, or then which exhibit different morphometric and/or texture features relatively to those which are in the reference sample (FIG. 7). The morphometric features taken into account for a given ion may for example be the number of objects, the average of the surface of the objects, the dispersion, the shape, the variability of the surfaces, etc. A reference sample of the same nature and/or of the same type as the sample of interest is therefore used preferentially.

Advantageously, the step i) may be applied by queering a database (DB) compiling a plurality of reference data sets of the reference sample, or by comparing the data of the sample with a model compiling a plurality of reference data sets of the reference sample.

Once the distinctive morphometric and/or texture datum (a) of the sample of interest have been identified, the corresponding ion(s) are associated with them in order to get back to the molecule associated with each of the ions.

This process is particularly useful in the pharmaceutical or medical field, notably for identifying novel biomarkers.

The object of the invention is also a data medium which is computer-legible comprising executable instructions for the computer and adapted for allowing a computer system to execute at least one step of the method for characterizing a sample according to the invention, and/or at least one step of the process for identifying a sample or a molecule of interest in a sample according to the invention.

Thus, the invention proposes a computer program comprising program code instructions for executing all or part of the steps discussed above, when said program is executed on a computer.

Advantageously, the computer program comprises program code instructions for executing at least the step for characterizing the spatial arrangement of one or several ions in a sample of interest.

Advantageously, the computer-legible data medium, or program, according to the invention includes a database, or a model, comprising morphometric and/or texture data of at least one ion in at least one sample, and preferentially of a plurality of ions for a plurality of samples.

Search for Markers

The process according to the invention may be used for identifying markers, and notably biomarkers. Indeed, in the case of biological samples, it is possible to identify morphology variations present between two conditions (for example ill vs healthy, treated vs a carrier, exposed vs non-exposed, etc.). Notably, according to the invention, it is possible to more particularly study ions specifically present in a region of interest, identified beforehand by a macroscopic and/or microscopic study of the structure of the sample for example.

Once the morphometric and/or texture features have been obtained, and if after statistical analysis, the shapes associated with the studied ions are considered as significantly different, it is sufficient to get back in a conventional way to the associated molecular mass(es) of interest(s). After queering specialized databases, the corresponding molecule(s) may be identified. For this, differential statistical tests may be used, in order to be based on the morphology of the molecular distribution elements and not only on the intensity. It is notably possible to use the Fischer test, the z test, the Student test, the Welch test, the paired Student test, ANOVA, the Dunett test, the Tukey test, the Kruskal-Wallis test, the Wilcoxon-Mann-Whitney test, a Wilcoxon signed-rank test, MANOVA, etc.

Filtering and Molecular Classification

The process according to the invention may be used for molecular filtering purposes.

For example, it is possible to select in an arbitrary way or not, a particular morphometry (for example, a star shape of X mm2 of minimum surface area) for performing a molecular filter in a sample. Thus, only the ions which enter the defined criterion(a) are selected. It is then possible to identify the molecules having the same shape impact as the one which is sought.

Such filtering may also allow classification of the samples. Thus, with the process of the invention, it is possible to obtain a similarity score based on the information on intensities and shapes. It is possible to automatically recognize in a sample, such as a biological tissue, the presence of a given shape which is for example characteristic of a physiological condition. It then becomes possible to establish classifications on the basis of more accurate and reliable scores than those exclusively based on the intensity criterion, which may itself vary depending on the preparation of the sample (deposition of a matrix, drying time, freezing, type of tissue, etc.) unlike the morphometric and texture features which are preserved regardless of the selected protocol.

According to the invention, it is advantageously possible to make up a database (DB) or a model, compiling the specifications of several samples from a same population, such as several samples from a same biological tissue or from biological tissues of the same origin/nature. From such a database, or from such a model, it is easy to identify a new sample of a same population or identify with certainty a sample in a population.

For example, it is possible to characterize a lung tissue sample as being fibrosis comparatively with a sample of healthy lung tissue. FIG. 2 shows more particularly the results obtained from the morphometric characterization of the imaging data sets obtained for the healthy lung tissue sample and the fibrosis lung tissue sample. According to the process of the invention, two morphometries are identified in elliptical shape, one of which has a ratio between the minor axis and the major axis tending to one (fibrosis tissue). The use of these morphometric signatures gives the possibility of characterizing two shapes of airways, healthy (Oval type 1) and fibrosis (Oval type 2), respectively.

Similarly, it is possible to characterize the inorganic samples, such as electronic components, automobile parts or other components, notably in order to carry out a quality control.

Cell Counting and Morphometric Sorting

The process according to the invention may also be used in the field of cell or bacterium counting, notably within the scope of an environmental or health evaluation. For this purpose, it is possible to select in mass spectrometry imaging, specific molecules of the cell wall (for example lipids), in order to emphasize the objects to be counted.

With the process according to the invention, the shapes are isolated with a molecular factor, while up till now, this is achieved with optical signals, and notably with optical microscopy or flow cytometry. The invention gives the possibility of overpass the limits of the detection sensitivity obtained with optical signals, but also of the working rate, and of accuracy (less positive false events) and to increase the number of parameters analyzed simultaneously. According to the invention, the cells may be numbered and recognized on the basis of their morphology, while indicating the molecular profile like the metabolic activity of the identified cell. It is therefore possible to number multiple cell, biological or histological types and their physiological activity.

FIG. 3 describes the automated counting by morphometry on imaging data sets obtained for samples of airways of two fibrosis tissues. The automated detection of oval shapes gives the possibility of identifying and numbering the histological structures of interest (here the airways) without any correlation with adjacent histological stainings.

Kinetic Study of Morphometries

The process according to the invention may also be used in the kinetic study of shapes, notably for following the time-dependent change in morphometry (shape, surface, volume . . . ) of elements of interest (molecules, ions, m/z) in the sample. It is notably possible to show a change in morphometry, for example enlargement or shrinkage, of a region of interest overtime.

It is also possible to contemplate evolution stages (time-dependent changes) in the shapes in a biological sample, consistent with other studies of stages of the biological sample. For example, it is possible via the process of the invention to obtain surface curves depending on one or several target masses overtime. If specific plateaus or stages are identified (morphometry variation, plateaus, oscillation of shapes . . . ), they may potentially be correlated with known stages of the biological sample (for example, a change in grade of a cancerous tissue).

FIG. 4 illustrates the application of the process according to the invention in the study of the time-dependent change of the constriction of airways in a fibrosis tissue. As this is illustrated, it is possible with the process of the invention to determine the surface area of the airways over time and therefore to follow the impact of fibrosis on the constriction of airways.

Cell or Tissue Typing

The process according to the invention may be used for identifying cell types or tissue sub structures in a plant or animal biological sample. This cell typing is made possible by the morphometries of each cell which are specific to them. Thus, depending on the obtained cell morphometries, it is possible to determine the cell type(s) contained within one or several samples.

Recently, instrumental developments have given the possibility of lowering the space resolution of MALDI imaging below 10 μm. The SIMS technology as for it gives the possibility of obtaining a resolution of less than 1 μm routinely. By considering that the average size of a cell is from 10-15 μm, it may be considered that mass spectrometry imaging reaches a cell resolution allowing them to be discriminated in molecular data sets.

FIG. 5 illustrates the application of the process of the invention within the scope of tissue typing on a skin tissue section and without any histological correlation. The areas of the tissue (stratum corneum and epidermis) are identified by their specific morphometries obtained after MSI acquisition.

Also, FIG. 6 illustrates schematically the application of the process of the invention within the scope of the numbering and cell typing directly on/in a biological sample and without any histological correlation. The cells of the sample (tissue, cell solution or culture) are typed by means of their specific morphometries obtained after MSI acquisition.

EXAMPLES

The invention will now be described in more detail by means of specific examples. These examples are given as an illustration and by no means as a limitation of the invention.

Example 1: Procedure for Characterizing a Sample or a Region of Interest by Combining Spectral and Spatial Information The purpose of the present example is to show the differences in pieces of information which may result from a same imaging data set acquired for a sample, depending on whether only the data related to the intensities for a given m/z ratio are taken into account in said sample or the morphometric and texture features associated with this m/z ratio.

Once the mass spectrometry imaging data (positions, m/z ratio, intensities) of a sample have been acquired, by any known method, for example it is proceeded with, according to the steps below:

1/ Loading the obtained images from imaging data;
2/ Determining a threshold for binarizing the images for example by using the Otsu method
3/ Labeling and counting objects via a non-optimized algorithm
4/ Recovering the number of non-zero positions in a variable
5/ Recovering the number of pixels of the object or of the image in one variable 6/ Calculating the average intensity in one variable
7/ Tests for determining whether an object has at least certain shape properties.

In a simplified way, step 3 may be applied via the algorithm below:

```
"As long as the image has not been covered entirely:
    Cover the image line by line
    If a non-zero pixel is encountered (it belongs to an object)
        Cover its neighborhood and neighborhoods neighboring 8
        connectednesses for setting the pixels of the object to 0
            Increment the object counter
        End of the neighborhood coverage
    End of the non-zero pixel
    End of the line coverage
End of the algorithm"
```

The test step 7 may for example be applied by making an opening (Erosion ε, followed by dilation δ) with a structuring element (SE) having property(ies) to be tested. If the addition of a pixel of the opening by SE is non-zero, then the image/the region has the property.

Opening: $A \ominus B = (A \ominus B) \oplus B$

Erosion: $A \ominus B = \{z \in E | B_z \subseteq A\}, B_z = \{b+z | b \in B\}, \forall z \in E$ Dilation: $A \oplus B = \{z \in E | (B^s)_z \cap A \neq \emptyset\}, B^s = \{x \in E | -x \in B\}$ Alternatively, it is possible to determine the size distribution of objects without segmentation process. For instance, once the mass spectrometry imaging data (positions, m/z ratio, intensities) of the sample have been acquired, it is possible to calculate a granulometry on each image, then compare the radius of the last opening of the granulometry, i.e., the opening of a structuring element (typically a disc) upscaled to the lowest size leading to a zero sum of intensity over the area. The opening consists in an erosion according to the structuring element followed by a dilation by a structuring element, typically the same. According to the erosion concept operator, the structuring element is displaced on the different positions of the image and a point is deleted if the structuring element is not completely included in an object. According to the dilation concept operator the structuring element is displaced on the different positions of an image and a point is added if the structural element is at least partially included in an object. Thereby, the method based on granulometry acts as a sieve, wherein the erosion destroys the objects that have a smaller size than the structuring element and the dilatation restores the points positioned on the border of an object that were lost during erosion. Thus, the granulometry allows to measure the size distribution of the objects that initially composed the image.

Results

The steps described above were applied to imaging data conventionally acquired for 2 segments (FIG. 1) each having a length of 6 pixels, continuously (FIG. 1A) or with fragments (FIG. 1B) and an identical average intensity on these 6 pixels.

While the taking into account of the sole intensities does not give the possibility of differentiating both segments, the morphological and texture characterization obtained by the process according to the invention gives the possibility of showing the differences between both segments (table 1).

TABLE 1

Characteristics resulting from the imaging data

| | Average intensity | Surface area | Number of objects | Surface area per object | Contains a segment of length 4 |
|---|---|---|---|---|---|
| Image 1 | 11.475 | 6 | 1 | 6 | Yes |
| Image 2 | 11.475 | 6 | 6 | 1 | No |

Example 2: Procedure for Identifying Peaks of Interest and Associated Biomarkers from Morphometric Data Material & Method Animals:

Five rat lungs were used for this study. Three come from rats having been subject to a treatment with bleomycin (Apollo Scientific, UK) through the airways (oropharyngeal aspiration route) at a dose of 1 mg/kg for seven days and two come from animals having received a saline solution in a similar way for the same period. All the rats were Sprague Dawley, Crl:CD (SD) male rats. Both groups were sacrificed twenty-two days after the beginning of the experiment. The lungs were inflated with agarose, set in formol with 10% of a neutral buffer solution and frozen to −80° C. The animal experiments were compliant with the Animals (Scientific Procedures) Act of 1986.

Preparation for Acquiring Mass Spectrometry (MS) Images:

For acquiring the images, ITO slides were purchased from Delta Technologies (Loveland, USA) and were covered with 9-aminoacridin (9AA).

Fresh tissue sections with a thickness of 12 μm were obtained by using a microm HM560 cryostat (Thermo Scientific, Germany) at −35° C. and mounted on ITO slides. Furthermore, sections of a homogenate of rat kidneys doped with a drug with a thickness of 10 μm were deposited on the same slides in order to be used as a quality control for evaluating the reproducibility and the variability. The slides were withdrawn from the cryostat after one hour and then dried for 20 minutes before being finally stored at −80° C. until their use.

The matrix used was a solution of 9AA at 5 mg/mL in a MeOH/H$_2$O (4:1 v:v) solvent; it was deposited in ten successive layers with an automated deposition apparatus Suncollect (SunChrom GmbH, Friedrichsdorf, Germany). The first layer was applied at a flow rate of 10 μL/min, the second layer at a flow rate of 20 μL/min and the following ones at 30 μL/min.

Acquisition of the MS Images:

A mass spectrometer MALDI-FTICR (7T Solarix, Bruker Daltonics, Brême, Germany) equipped with a SmartBeam II laser used with an output energy of 80% and a repetition rate of 1000 Hz was used for acquiring mass filters in a "full scan" mode for m/z comprised between 100 and 1,000 with a spatial resolution of 30 μm and in a negative mode. Each mass spectrum corresponds to the accumulation of 500 consecutive laser shots at the same location. Internal calibration was carried out by using the 9AA matrix as well as phospholipids comprised between the m/z of 200 and 900. The mass spectrometer was controlled by using FTMS Control 2.0 and FlexImaging 4.0 software packages (Bruker Daltonics, Brême, Germany).

The regions selected for acquisitions were lung airways since bleomycin should induce changes therein.

Detection of Peaks:

Are considered as peaks, the maxima of the average spectrum transformed from a condition exceeding a threshold. The used transformation was the subtraction of the median of the signal without the zero values divided by the absolute deviation from the median of the signal without the zero values, multiplied by 1.4826. This gives an approximation of the signal-to-noise ratio in each point. The idea being that the noise follows a more or less normal distribution and that the real signal is present in less than half of the aggregated measurements in the average spectrum, the suppression of the zero values was accomplished since the signal seems to have undergone a compression by destructive wavelet by FTMS Control 2.0. Other ways of approximating the noise were tested (for example, the same measurement but accomplished locally, or the distance from one peak to a Gaussian distribution assume to represent it) but have not given better results for low thresholds. The retained threshold for this study is 1 in order to have as less negative false as possible but excluding as much as possible of the noise.

The Exported Images:

For each detected peak, corresponding to a potential biomarker, and for each imaged region, the image of the maximum intensity in the window of the peak is stretched in a range of gray levels having a depth of 8 bits and is then exported in the JPEG format without any compression. The choice of only using a single channel was made for facilitating the visual inspection of the results. About 2,000 ions to be imaged on 12 regions (6 in the condition 1 and 6 in the condition 2) were obtained.

Morphological Characterization:

For each image:

In order to remove noise from the image, an opening is made on the image in gray levels by using a structuring element of size 2×2, followed by a closure using the same structuring element: $I=(((O \ominus B_1) \oplus B_1) \oplus B_2) \ominus B_2$, O being the original image in gray levels, in our case $B_1=B_2=B$, the structuring element, a Boolean mask of values varies centrally in the right hand lower corner, the missing values have been obtained by duplicating the closest line or column.

The image is then binarized by applying the Otsu method (in our case with a single threshold): the maximization of $\eta = \sigma_B^2 / \sigma_T^2$ with $\sigma_B^2 = \omega_0 \omega_1 (\mu_1 - \mu_0)^2$ and $\sigma_T^2 = \Sigma_{i=1}^L (i - \mu_T)^2 * p_i$, with $\omega_0 = \Sigma_{i=1}^k p_i$, $\omega_1 = 1 - \omega_0$, $\mu_0 = \Sigma_{i=1}^k i p_i / \omega_0$, $\mu_1 = \Sigma_{i=k+1}^L i p_i / \omega_1$, $p_i = n_i / N$, $p_i \geq 0$, $\Sigma_{i=1}^L p_i = 1$ for an image containing N pixels, L gray levels and $n_i$ the number of pixels assuming the gray level i value;

Before or after this, the surface area of the pixel image is calculated;

And then, the number of objects in the binarized image is counted by using the cardinal of the whole of the labels used for generating the labeled image as described in Rosenfeld and Pfaltz (1996) in a 4 connectedness;

Finally, the average surface area of the objects per unit surface is established.

Comparison:

Two Welch t tests were made under both conditions, one based on the number of objects per unit surface and the other one on the average surface area of the objects per unit surface. The Welch t test was retained since it applies well to non-paired samples of a small size and that it is not certain that the variances of both populations are equal. A Mann-Whitney-Wilcoxon test could otherwise have been used.

200 biomarkers were identified as significantly different between the control condition and the treated condition on the basis of use of morphometric criteria, certain biomarkers of which are only identified by using morphometric criteria.

As this is illustrated in FIG. 9, a membrane component involved in apoptosis was able to be identified (m/z 718.505), which was not detectable by only taking into account intensities (NS: Not significant; *: significant difference).

Modeling:

A mathematical model was made on the basis of the potential identified biomarkers of the treated condition. This model was used for exploratory purposes in order to classify test samples on the basis of the extracted morphometric features.

The present study may be continued for:

Standardizing the data;
Performing identification of peaks in order to associate a molecule to a peak;
Performing biological interpretation;
Performing the classification/machine learning for example by using cloud platforms.

Example 3: Other Applications

Very many applications may be contemplated, and may notably be applied by using the steps described in Example 1 or Example 2. For example, as this was discussed above, the invention may be used in the medical and pharmaceutical field, in order to identify novel biomarkers, for molecular filtering and classification, cell and morphological counting, study of the development overtime of a disease or of a treatment, cell or tissue typing, etc. According to the invention, it is also possible, from distribution surfaces and/or volumes of an ion in a sample, to quantify relatively or absolutely said ion in said sample. Of course, the invention finds applications in other fields, such as quality control, art, compared and automated object analysis, study of the composition of materials, etc.

Example 4: Procedure for Identifying Biomarkers of Interest and Discriminating Samples In this example, a new computer vision workflow for an image-first analysis is proposed for both processing and analysis steps.

Images features from each detected m/z values have been extracted and then characterized by applying the Otsu method, to generate a quantitative descriptive model based on intensity, average surface or number of regions defined by each m/z value (objects).

First, this workflow was applied to generate histological models on a kidney model and CT26 xenograft tumor model. Afterwards, the workflow was applied to the identification of m/z presenting a heterogeneous distribution in the tumor tissue.

Material & Method

Chemical and Reagents

All chemicals including 1,5-diaminonaphtalene (1,5-DAN), 9-aminoacridine (9-AA), acetonitrile, methanol, LC-MS water and trifluoroacetic acid (TFA) were purchased from Sigma-Aldrich (St. Louis, Mo.).

Sample Collection and Tissue Preparation

B BALB/c mice were inoculated, subcutaneously, with 10(3) CT26 cells that is an N-nitroso-N-methylurethane-(NNMU) induced, undifferentiated colon carcinoma cell line. After tumor growth, mice were sacrificed by cervical dislocation. Organs (kidney) and transplanted tumor were dissected, extracted and snap frozen in liquid nitrogen for 15 s. The samples were kept at −80° C. until use. Ten-μm thick sagittal tissue sections were obtained using a cryostat microtome (CM-3050S, Leica, Germany) with a microtome chamber and a specimen holder chilled at −17 C. They were thaw mounted onto Indium-Tin-Oxide (ITO) coated slides for downstream MALDI imaging.

For MALDI MSI of lipids and metabolites a uniform layer of 1,5-diaminonaphtalene (1,5-DAN) prepared at 10 mg/mL with 50/50 ACN/$H_2O$/0.1 TFA matrix was deposited onto the kidney sagittal tissue sections using the sublimation procedure.

For the tumor imaging, a uniform layer of 9-aminoacridine (9-AA) matrix was deposited using the SunCollect and a solution 30 mg/ml 9-AA in 70% MeOH and 0.1% TFA (1 layer at 10 uL/min, 1 layer at 20 uL/min and 3 layers at 35 uL/min).

MALDI-FTICR Imaging

MALDI MSI of lipids and metabolites was performed using 7T MALDI FTI-ICR (SolariX XR, Bruker Daltonics, Bremen, Germany) with a SmartBeam II laser. MSI data were recorded in positive ion mode (kidney sagittal tissue section, 1,5-DAN, m/z range 100-1000 70 μm, at 20 μm of spatial resolution with an on-line calibration) and negative ion mode (tumor tissue, 9-AA matrix, m/z range 50-1000 at 70 μm pixel size with an on-line calibration).

Data acquisition, processing, and data visualization were performed using the Flex software suite (ftmsControl 2.1.0, FlexImaging 4.1 and DataAnalysis 4.2) from Bruker Daltonics and Multimaging (ImaBiotech SAS, France). MSI data were acquired from each tissue section as well as matrix control areas adjacent to the tissue sections to check for analyte dispersion during sample preparation. After MSI data acquisition, the matrix was washed off with 70% and 95% ethanol and the tissue samples stained with hematoxylin and eosin solution (H&E stain). High-resolution histological images were obtained with a digital slide scanner.

Data Processing Workflow for Kidney

The 1000 most intense apexes of the mean spectrum of the acquisition were used to generate a linear greyscale gradient with 256 levels images with a low threshold of 1 000 000 arb. unit. Masks for the pelvis, medulla and cortex were generated on the basis of contrast ions and confirmed by coregistration to Hematoxylin & Eosin (HE) staining. These masks were used to isolate each region before binarization by Otsu's method (determination of the threshold that separates the dataset in two while minimizing the intra-class variance). After binarization, objects having a surface lower than 4 pixels (1600 square micrometers) were deleted. Image association to a region was then defined on the basis of where 80% of the non-null values were present.

Data Processing Workflow for Tumor

The 200 most intense apexes of the mean spectrum of the acquisition were exported at each position and a low threshold of 1 000 000 arb. unit was applied. Masks for the necrotic and proliferation regions were generated on the basis of contrast ions. These masks were used to isolate each region before binarization by Otsu's method. After binarization, objects having a surface lower than 4 pixels (4900 square micrometers) were deleted.

Results and Discussion

In order to obtain a descriptive model of the samples that includes image characteristics, a workflow was established (FIG. 10).

In the first step of the workflow, focus was made on detecting the m/z values and creating binarized image that allows to define segments or objects (defined as region of interest). To obtain such binarized images, a threshold was applied to minimize noises, delete structures that were considered noises in the binarized images and analyzed the image through the number of objects and their surface. Of course, the described workflow can be shortened, as some steps can be omitted depending on the information to extract (e.g., each spectrum has not to be normalized; by applying Haralick features (Haralick et al. Textural features for image classification. *IEEE Transactions on systems, man, and cybernetics* 1973, (6), 610-621) which characterize an image's texture and can be extracted at the image generation step, image treatment, binarization and binarized image treatment can be bypassed, etc.).

Control Kidney

As a proof of concept, the workflow was applied on a control kidney section. The morphometry information was studied and the obtained information analyzed. For extracting image features of each m/z values of the kidney, MSI was performed followed by data processing.

First, the peak picking method was applied. The slope's numerator to list maximima was used and their values then kept the 1 000 highest ones with a tolerance of 10 ppm. This method is simple but prone to false positives and some peaks might overlap. The number of peaks taken was probably higher than the number of peaks really present in the spectrum, but was chosen to improve the chances to take into consideration all the real peaks.

Then, MS image treatment started with a low threshold at 1 000 000 arb. unit. to eliminate most noises (visually determined by mean spectrum inspection) and projection to a displayable format (256 grey level image) for ease of visualization and visual validation.

Based on histology/contrast ions, masks were then applied to the pelvis, medulla and cortical regions. As the tissue is heterogeneous, the m/z behavior in these substructures was expected to differ which was seen as of interest.

Such masks allow the analysis of each region to be more robust as each is based on the region intensities/features with less influence from the others as they only impacted the projection to the grey level image.

Four images (one for each region and the original one) were then binarized using Otsu's method. Otsu's method automatically determines the best threshold as the one that minimizes the intra-class variance which is the same as maximizing inter-class variance—the idea being that there are two kinds of pixels, foreground and background pixels, following different unimodal distributions.

A first treatment of those binarized images consisted in deleting the objects having a surface lower than 4 pixels (1600 square micrometers). This was one because even after the 10e6 arb. unit threshold, some noises was still present. Visual inspection showed that this high intensity noise was unlikely to occur in more than three sequentially connected positions (4 connexity: considering one pixel, the one above, below, to the left and to the right are considered connected. As three positions were considered, this noise gave, at worst, trominos) and considering the image quality, objects could hardly be of less than 4 pixels.

The number of strictly positive values in the binarized original image was used to determine a threshold for assigning a m/z to a region or none. This was done to reduce the workload by focusing on the m/z related to the substructures which, as mentioned before, were supposed of interest. However, due to the way m/z were assigned to classes, some specificity was lost as a region can hold 80% of the non-null values of the non-masked image and yet the 20% left can cover an important part of another region, especially in the case of the pelvis. Moreover, the global threshold and the masked threshold do not have a direct correspondence.

Out of the 1000 initial m/z, 409 were considered to hold information. Out of those, 253 could be assigned to a region (25 in pelvis, 180 in medulla, 48 in cortex). The medulla was considered to be overrepresented due to its size relative to the other regions. The number of objects (still using 4 connexity) and the total surface were computed for the images associated to a region. The number of objects was compiled and the total surface for each m/z image that held information in FIG. 11a was also compiled. Pelvis, medulla and cortex images had an average surface of 216.36 pixels (SD: 323.79), 5488.96 pixels (SD: 4934.07) and 2939.33 pixels (SD: 3358.39) respectively, and an average number of objects of 6.6 (SD: 4.76), 75.87 (SD: 70.08) and 38.75 (SD: 44.73) in their respective regions. As shown in FIG. 11b, a sagittal section where the pelvis had the smallest surface followed by the cortex, was used, those results appear prima facie valid.

A correlation between the maximum number of objects and the maximum surface was observed: the higher the region's surface, the easier it is split in a high number of objects. The shape was similar for each region. At the lower left end, there were very few objects and those objects were small, such images correspond to a single hotspot. Then as the number of objects increases, even if they have the same individual surface, the cumulated surface increases.

Finally, the objects merge, the number of objects diminishes again while the surface increases until there is only one cold spot.

This explanation is supported by the examination of the scatterplot of pelvis associated images along the surface and number of object axes (FIG. 12). The bottom left image shows only a single object of four pixels, the top image almost delineates the shape of the pelvis but with many holes and the rightmost image is similar to the top image but with most holes filled. Moreover, the selected morphological features allow to extract m/z which wouldn't have been easily identified in an average intensity based paradigm such as images with holes.

Of course, these two features only give a high level view of each m/z image and not the whole morphology. But even with this simple workflow, it is possible to go further such as by estimating the probability density function (pdf) of the objects' surface. In FIG. 13A, using violin plots, two images with a similar value for the surface parameter have a different distribution of individual object's surface, that are validated by visually inspection of the distributions in FIG. 13B. The pdf can be the basis of other studies using, for instance, the two sample Kolmogorov-Smirnov test to reject or validate the hypothesis that two images have the same underlying distribution of object size.

Overall, basis for a model have been created: using a kidney, the most intense peaks behavior was described (belonging to a region, having a surface and a number of objects in that region) which can be used together with the intensity in this section.

Workflow for Tumor Section

A similar morphometric workflow was applied for a tumor section, as a question concerning the heterogeneously distributed molecules in the different tumor microenvironment still remains and the analysis of morphology of each m/z value may answer this question.

In the tumor sample case, the kidney procedure was conducted with few refinements. The number of peaks to use was reduced to treat less noises. The masks mainly represented the proliferative and necrotic regions. No projection to 256 grey levels was performed to better conserve the dataset. Otsu's method was applied to the non-null values in order to only use the acquired values that were not deem as noises. These values were the ones which could show intratumoral heterogeneity and so, the surface for both regions were computed as they are both tumor. This led to obtaining the basis of a model combining the number of objects and surface information in the two regions.

The 200 m/z ions had an average surface of 339.685 pixels (SD: 457.87) and 816.125 pixels (SD: 924.08) and an average number of objects of 14.88 (SD: 16.51) and 22.845 (SD: 19.41) in the necrotic and proliferative region respectively.

Looking for heterogeneous m/z, those that have a small and a high surface were both excluded: both empty (black) and full (white) images are homogeneous. Furthermore, in order to have a number of objects not too far from the mean as otherwise we might take either single hotspots or cases where the number of objects is so high their distribution over the image will be homogeneous. To this end, having a sum of standard scores for both regions between 1 and 3 for the surface and −1 and 1 for the number of objects were considered as heterogenous m/z. With these criteria, 5 potentially heterogeneous m/z were identified. By looking at the scatterplot of the sum of the standard scores for both regions, it was decided to look at m/z 185.023 because this had the highest surface for the lowest number of objects of the five which would facilitate visual validation.

FIG. 14A shows the distribution of the data points in the 3D space based on the scores for surface and number of objects and m/z. FIG. 14B is the projection of the 3D data points along the surface score and number of objects score axes. FIG. 14C shows a HE stained adjacent slice. FIG. 14D is the image associated with the m/z 185.023.

As well shown, it is heterogeneous in both regions, mostly present in the upper part of the necrosis region and in the upper right part of the proliferation region. So, a potentially interesting m/z that may help to determine the intratumoral spatial heterogeneity of necrosis patterns, amount of cellular proliferation and vascularity was found. As we could clearly imagine, the histological localization of this ion of interest and even others could translate one of the hypoxic heterogeneity features. This intratumoral modelization of proliferation and necrosis extent would certainly be important to understand both the natural history of neoplasms and the selection of test samples for reliable analysis during diagnosis, prognosis, and monitoring treatment response.

In both cases, the principal limitation that were identified at this level was the use of the global Otsu's method for assignation to background or foreground as it assumes a bi-modal histogram over the whole image. Other segmentation methods can be of interest as they generate labeled images which can be analyzed as objects of different natures rather than groupings of positions per similarity. Alternatives to the global Otsu's method for object detection should be considered, such as applying the local (that will identify local in addition to global hotspots) and/or multilevel (that will identify the distribution of interest if there is more than two underlying classes) version of Otsu's method or balanced histogram thresholding for instance. A completely different method such as those based on watersheds or active contours may be of interest when thresholds need more adaptation to local conditions than is provided by the local versions of Otsu's method or balanced histogram thresholding.

CONCLUSION

The experimentation performed confirms that the process of the invention may be used for kidney description and intratumoral heterogeneity detection. An approach based on the image's features was applied to generate a model that integrates intensity, number of objects and average surface per object for a plurality of m/z values. This allowed to describe a mouse kidney and identify a m/z of interest in a tumor. As exposed above, the approach can be used for comparing individual m/z images.

For this study, focus was made on "number of objects vs. total surface of objects" and "average surface of objects vs. maximum radius of opening of a granulometry". However, the proposed approach can be easily applied to other parameters, such as "dispersion of object's geometrical center", "correlation between skeleton and pattern vs. number of objects after opening with shapes" or "surface IQR vs. changes in average surface when resampling". Additionally, it is possible to determine automatically whether a m/z follows a central or peripheral distribution (e.g. for drug penetration in tumor), the average distance between objects (e.g. for glomerulonephritis diagnosis) and looking for specific shapes (astrocyte counting). The shape of the image could also be described to show, for instance, epithelium in tissues.

In conclusion, the workflow as presented allows to extract a higher level of information from MSI datasets that can complement most analyses. Such information can be used in many contexts, including image peaking, classification or differential analysis. This information is quantitative and can be used to define pathology profiles with multiple parameters in order to, for example, define models of different tumor grades or tumor progression for diagnostics or prognostics purposes.

The invention claimed is:

1. A process for identifying by mass spectrometry imaging (MSI) a molecule of interest in a sample of interest, the process comprising:
analyzing a spatial arrangement of a plurality of ions in the sample of interest from MSI data of said ions in said sample to determine morphometric features and/or texture features associated with said ions in said sample, the morphometric features defining geometrical patterns formed by a presence of said ions and mathematical dimensions of the geometrical patterns, the texture features defining an arrangement of the geometrical patterns in said sample;
comparing the morphometric and/or texture features associated with the plurality of ions in said sample of interest with morphometric and/or texture data associated with a plurality of ions in a reference sample;
identifying at least one characteristic ion of the sample; and
identifying the molecule corresponding to said identified ion.

2. The process for identifying a molecule in a sample according to claim 1, wherein the mathematical dimensions of the geometrical patterns are selected from a surface, a volume, a diameter, a radius, a length, a width, and a thickness.

3. The process for identifying a molecule according to claim 1, wherein the arrangement of the geometrical patterns is defined as a plurality of recurrent patterns, a distance between patterns, and/or a dispersion between patterns.

4. The process for identifying a molecule in a sample according to claim 1, further comprising providing the morphometric features and/or the texture features associated with at least one ion directly on an image of the sample.

5. The process for identifying a molecule in a sample according to claim 1, wherein the analyzing the spatial arrangement comprises applying a recognition process of shape and/or texture analysis.

6. The process for identifying a molecule in a sample according to claim 1, further comprising a preliminary step of acquiring data by MSI, for a plurality of ions in the sample.

7. The process for identifying a molecule in a sample according to claim 1, further comprising forming a database (DB) or a model comprising morphometric features and/or texture features of a plurality of ions in said sample of interest.

8. The process for identifying a molecule in a sample according to claim 7, further comprising implementing the database (DB) or the model with the spectral MSI data of at least one ion in said sample of interest, and/or physicochemical, physiological and/or biological data specific to said sample of interest.

9. A non-transitory computer-legible data medium comprising instructions executable by a computer, configured to allow a computer system to execute the process for identifying a molecule of interest in a sample according to claim 1.

10. The non-transitory computer-legible data medium according to claim 9, further comprising a database comprising morphological and/or texture data of at least one ion in at least one sample.

11. A method to determine morphometric features and texture features of at least one ion in a sample, the method comprising:
providing a mass spectrometer; and
utilizing the mass spectrometer to generate mass spectrometry imaging (MSI) data of the at least one ion to characterize said sample by geometrical patterns formed by the presence of said ions, and mathematical dimensions of the geometrical patterns in said sample, and by an arrangement of said patterns in said sample.

12. The method for determining morphometric features and texture features of at least one ion in a sample according to claim 9, wherein the mathematical dimensions of the geometrical patterns are selected from a surface, a volume, a diameter, a radius, a length, a width, and a thickness.

13. The method for determining morphometric features and texture features of at least one ion in a sample according to claim 11, wherein the arrangement of the patterns are defined as a plurality of recurrent patterns, a distance between patterns, and/or a dispersion between patterns.

14. A method for characterizing a sample by mass spectrometry imaging (MSI), the method comprising:
characterizing a spatial arrangement of at least one ion in said sample from imaging data associated with said ion, in terms of morphometric features and texture features, the morphometric features defining geometrical patterns formed by a presence of said ions and mathematical dimensions of the geometrical patterns, the texture features defining an arrangement of the geometrical patterns in said sample.

15. The method for characterizing a sample by MSI according to claim 14, further comprising:
acquiring data by MSI, for at least one ion in the sample, wherein the spatial arrangement of said at least one ion in the sample is characterized from data relative to the positions of said at least one ion in said sample by the morphometric features and the texture features.

16. The method for characterizing a sample by MSI according to claim 14, further comprising:

segmenting imaging data of the sample into regions of interest representative of the molecular intensity profiles of the sample, and characterizing a spatial arrangement of the ions of the molecular profile of a region of interest by morphometric features and texture features of said molecular profile.

17. The method for characterizing a sample by MSI according to claim 14, further comprising:

forming a database (DB) or a model, comprising morphometric features and/or texture features of a plurality of ions in said sample.

18. The method for characterizing a sample by MSI according to claim 17, further comprising the additional step according to which:

implementing the database (DB) or the model with spectral MSI data of at least one ion in said sample, and/or physicochemical, physiological and/or biological data specific to said sample.

19. A method for identifying a tissue, a region of a tissue, a cell type, a physiological condition of a tissue or the cell counting in a biological sample, the method comprising:

performing the characterization method of claim 13, utilizing the characterization method to create a database of a model; and utilizing the database to perform identification.

20. The process for characterizing a sample according to claim 14, wherein the mathematical dimensions of the geometrical patterns are selected from a surface, a volume, a diameter, a radius, a length, a width, and a thickness.

21. The process for characterizing a sample according to claim 14, wherein the arrangement of the patterns are defined as a plurality of recurrent patterns, a distance between patterns, and/or a dispersion between patterns.

22. A process for identifying a sample by mass spectrometry imaging, the process comprising:

characterizing a spatial arrangement of at least one ion in the sample to be identified from MSI data of said ion in said sample in order to identify morphological features and texture features of said ion in said sample to be identified;

recording the identified morphometric features and/or the identified texture features; and comparing the morphometric features and/or the texture features associated with said at least one ion of the sample to be identified with morphometric and/or texture data associated with a reference ion, wherein the morphometric features define geometrical patterns formed by a presence of said ions and mathematical dimensions of the geometrical patterns, and the texture features define an arrangement of the geometrical patterns in said sample.

23. The process for identifying a sample by MSI according to claim 22, further comprising establishing a database or a model with morphometric and/or texture data associated with at least one reference ion, obtained from several reference samples, said morphometric and/or texture data being representative of the spatial arrangement of said at least one reference ion in said reference samples, the comparing comprising comparing the morphometric features and/or the texture features associated with said at least one ion of the sample to be identified with the morphometric and/or texture data from the database or the model.

24. The process for identifying a sample according to claim 22, wherein the mathematical dimensions of the geometrical patterns are selected from a surface, a volume, a diameter, a radius, a length, a width, and a thickness.

25. The process for identifying a sample according to claim 22, wherein the arrangement of the patterns are defined as a plurality of recurrent patterns, a distance between patterns, and/or a dispersion between patterns.

* * * * *